March 18, 1958  P. G. NOVIANT  2,826,822
THREAD GAGES HAVING FEELERS ADAPTED
FOR QUICK CALIBRATION
Filed July 14, 1953  5 Sheets-Sheet 3
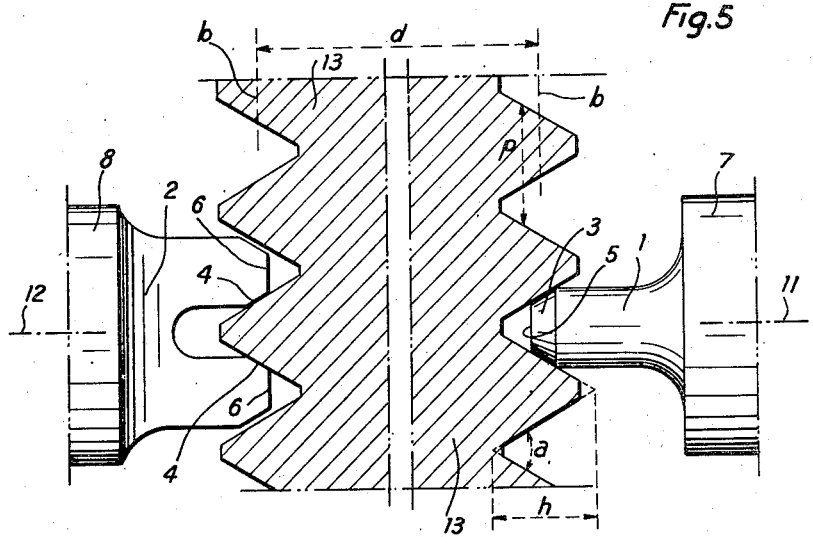
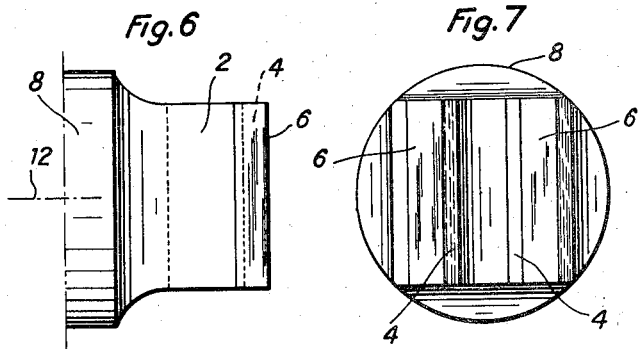
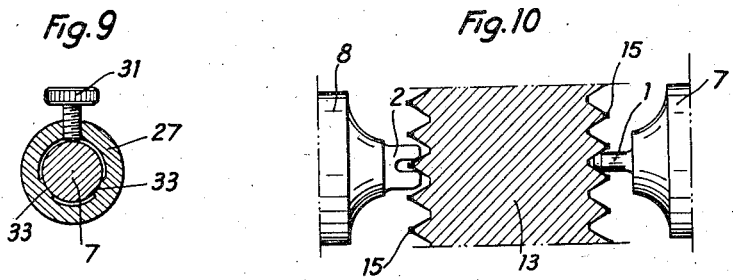
Inventor
Paul G. Noviant
By Young, Emery & Thompson
Attys.

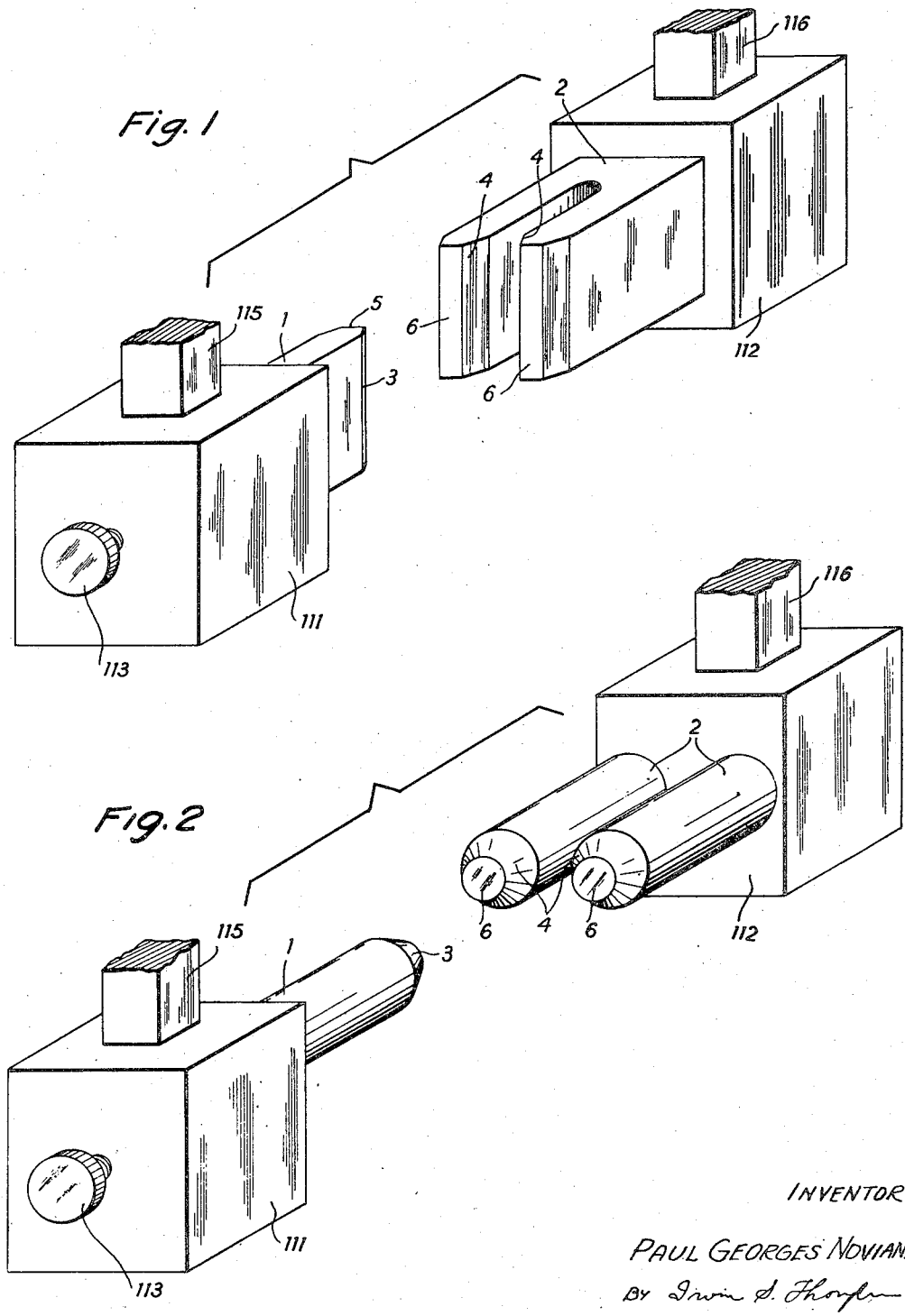

March 18, 1958 P. G. NOVIANT 2,826,822
THREAD GAGES HAVING FEELERS ADAPTED
FOR QUICK CALIBRATION
Filed July 14, 1953 5 Sheets-Sheet 4
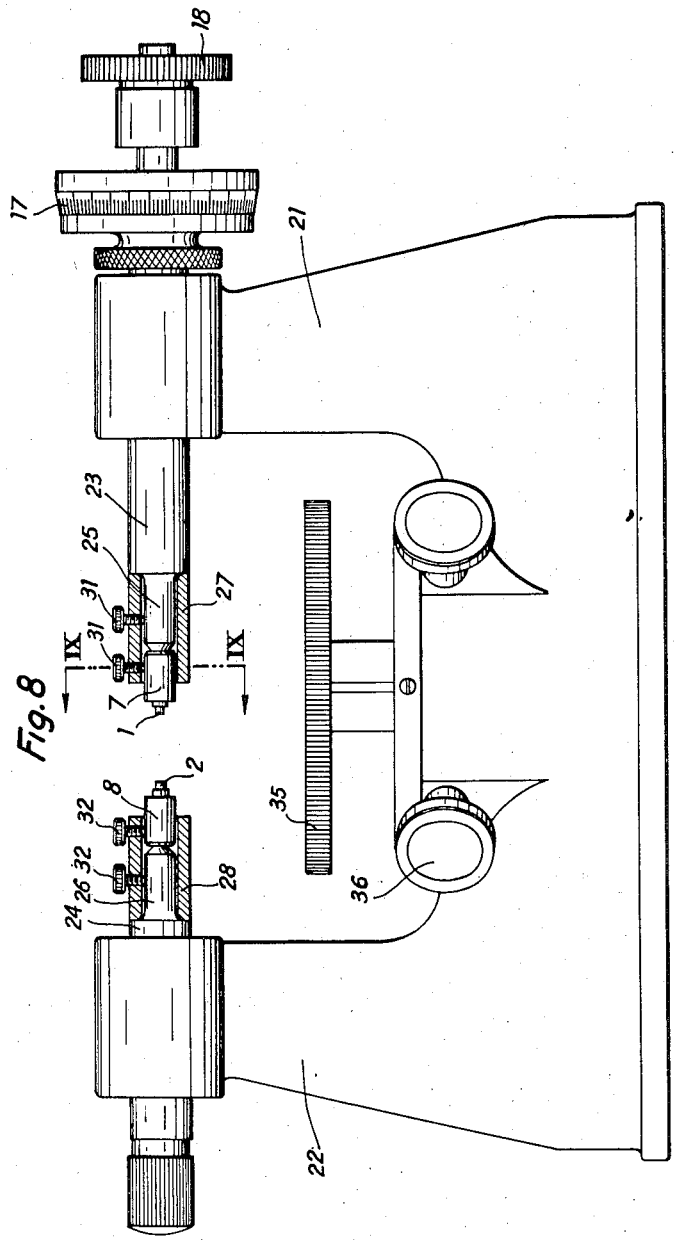
Inventor
Paul G. Noviant
By
Young, Emery & Thompson
Attys.

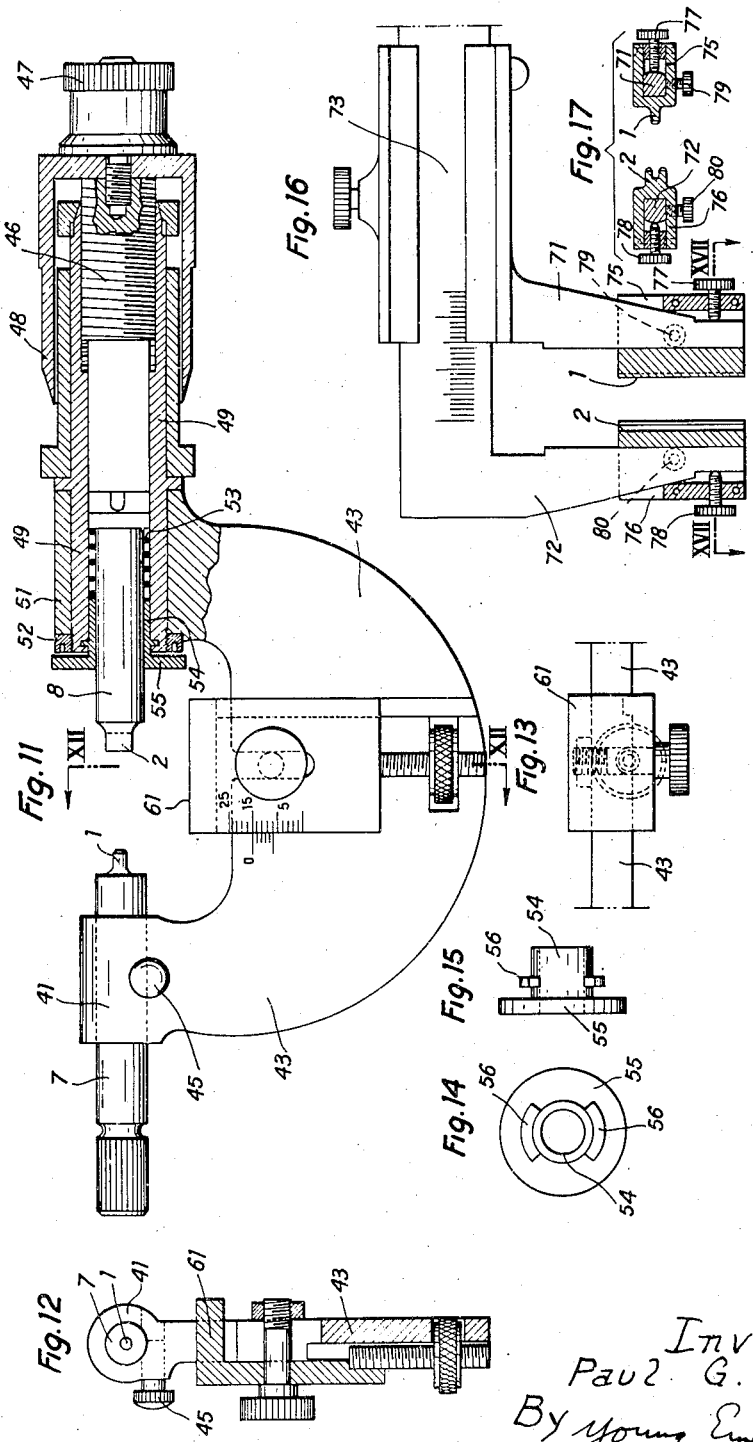

United States Patent Office 2,826,822
Patented Mar. 18, 1958

2,826,822
THREAD GAGES HAVING FEELERS ADAPTED FOR QUICK CALIBRATION

Paul Georges Noviant, Choisy-le-Roi, France

Application July 14, 1953, Serial No. 367,782

Claims priority, application France August 8, 1952

6 Claims. (Cl. 33—199)

Many kinds of appliances exist which enable the mean diameter of threadings to be ascertained, i. e., the arithmetical mean of the external and internal diameter of threads.

Among these appliances, should be mentioned those which make use of three calibrated cylinders, which are inserted in the threads of the screw perpendicularly to the axis of the latter, one of the cylinders being opposite to the other two, the contact point of the threads with these cylinders being substantially on the mean diameter of the screw. The cylinders are held in contact against the threads by means of a comparator and computations are necessary for ascertaining the mean diameter of the threading from the reading given by the comparator. Measurement in these conditions is long, relatively complicated, and sources of errors are numerous.

Another measuring process consists of employing devices called "feelers," which comprise a male member terminated by a cone and a female member which comprises two identical cones, these two members whose axes are parallel being arranged head-to-tail and secured to the arms of a micrometer or a comparator. For measuring, these feelers are inserted between the threads, perpendicularly to the threading axis, the height of the conical parts being such that there is contact over the entire length of the thread. Nevertheless, feelers of this kind show numerous disadvantages.

In the first place, measurement is generally somewhat inaccurate, for it is difficult to make sure that the active surface of the feeler is properly in contact with the screw along the entire length of its side. Furthermore, should this side not be rectilinear, the measurement becomes quite inaccurate.

In the second place, with appliances of this kind, it is necessary to have a very considerable number of feelers, varying for the threadings with the pitch, angle at the apex and the theoretical height of the thread. Lastly, the calibration of these instruments must be accomplished with threaded calipers.

The present invention relates to improvements to the devices of this kind of feelers, adaptable to various measuring instruments, enabling the mean diameter of threadings to be speedily and accurately ascertained; as it only calls for a small set of feelers, the latter can moreover be employed even on imperfect threadings, as the calibration of these instruments is achieved by means of simple prismatic gauges.

According to the invention, the feelers for ascertaining the mean diameter of threadings comprise a male member and a female member facing in opposite directions and intended to be secured to the opposite arms of an appliance for measuring thicknesses, the male feeler coming into contact with the sides relating to two consecutive threads of the threading to be measured and the two sides of the same thread being inserted in the female feeler, these feelers being characterised by the fact that they have a common plane of symmetry and are provided with truncated thread-engaging surfaces of the same inclination as the flanks of the thread, the height of said truncated surfaces being less than two-tenths of the height of the threads and the contact between the flanks of the threads and the said truncated surfaces extending partly on one side and partly on the other side of the mean diameter of the thread, each of said feelers comprising in addition a reference plane surface perpendicular to the axis of displacement of the feelers.

Other special features connected with the invention will also be revealed in the description which follows.

In the attached drawings, several forms of embodiment of the invention are shown by way of nonrestrictive examples.

Figures 1 to 3 are large-scale perspective views showing the truncated surfaces which terminate the male and female members of the feelers.

Figure 5 shows an elevation of the measurement of the mean diameter of the threading with a feeler similar to that of Fig. 3.

Figures 6 and 7 are lateral elevation views of the face of the female feeler.

Figure 8 is an elevation view of a workshop comparator provided with a feeler according to the invention.

Figure 9 is a larger scale section through IX—IX of Fig. 8.

Figure 10 is an explanatory sketch of the feelers while in contact with a distorted thread.

Figure 11 is a partial sectional elevation of a micrometer according to the invention.

Figure 12 is a section along XII—XII of Fig. 11.

Figure 13 is a view seen from above of the central part of the micrometer.

Figures 14 and 15 show a front and lateral elevation of a detail of this micrometer.

Figure 16 shows a partial elevation view of a sliding caliper gauge according to the invention.

Figure 17 is a section through XVII—XVII of Fig. 16.

Figure 3:
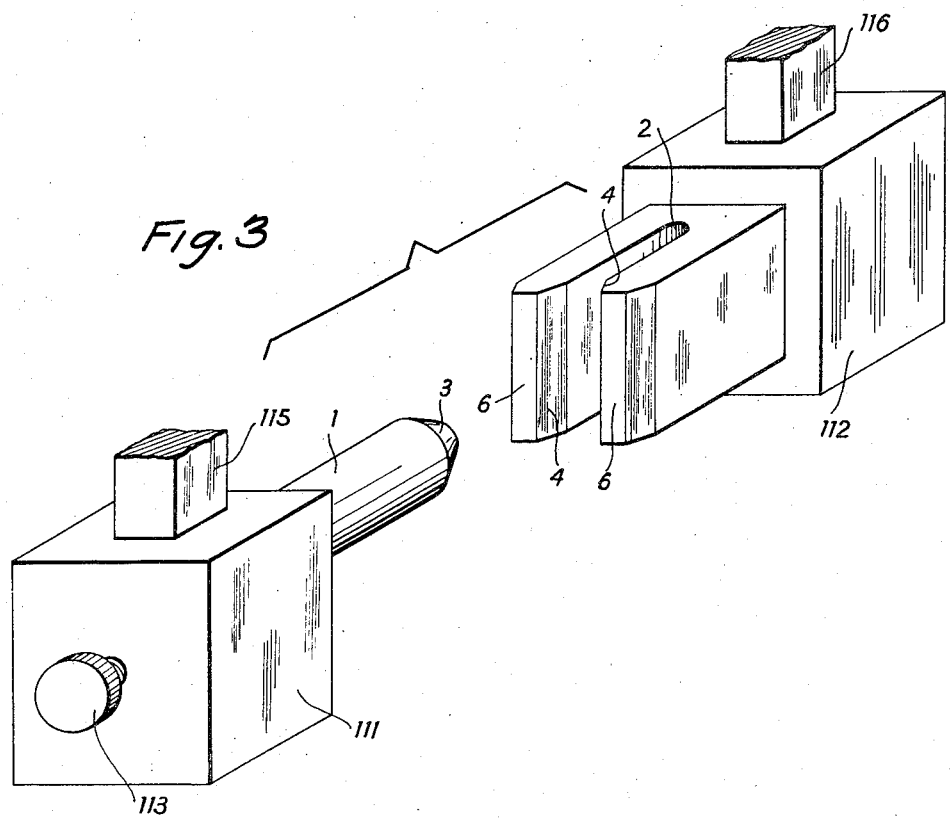

In the forms of embodiment of Figures 1 to 3, 1 designates the male feeler and 2 the female feeler. These feelers are so arranged in relation to each other, that the symmetrical plane of the female feeler is also the symmetrical plane of the male feeler and that furthermore they extend in opposite directions. These feelers are fitted on brackets 111, 112, fastened for example by means of screws, such as 113, to the arms 115 and 116 of an apparatus for measuring thicknesses not shown. The arms 115 and 116 are opposite to each other and displaceable in relation to each other, the feelers 1 and 2 being thus made axially displaceable.

In the feelers intended to measure external threadings, screws or bolts, for example it is provided that the truncations of the surfaces 3 and 4 are limited by plane reference surfaces 5 and 6 which are parallel and perpendicular to the axis of displacement of the feelers.

To be more precise, in Fig. 1, the truncated surfaces 3 and 4 limiting the feelers 1 and 2 are prismatic, the terminal surfaces 5 and 6 being moreover perpendicular to the common symmetrical plane of the feelers 1 and 2.

In the form of embodiment of Fig. 2, the surfaces 3 and 4 are truncated cones whose axes are parallel between them and parallel to the aforementioned symmetrical plane.

Lastly, in the embodiment of Fig. 3, the male feeler 1 is similar to that of Fig. 2, the feeler 2 being similar to that of Fig. 1.

The method of performing the invention is explained below, in the case where the feelers are of the type shown in Fig. 3, but it goes without saying that these explanations also apply to the feelers of Figures 1 and 2.

Figure 4:
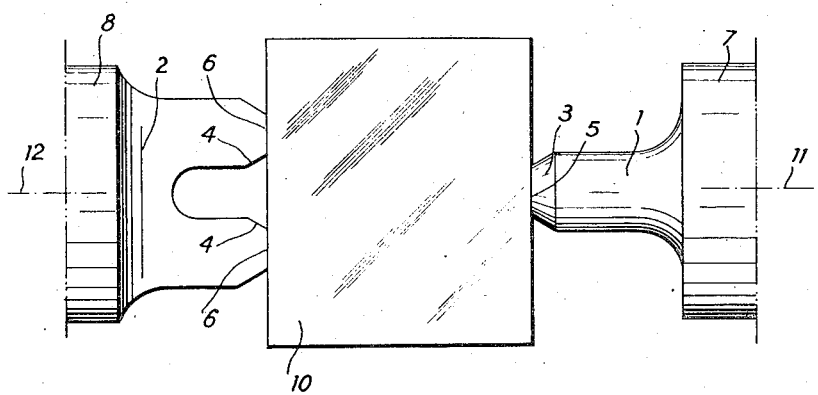
Figure 4 is an explanatory sketch releating to the operation of the feelers.

The feelers 1 and 2 are secured (Figs. 5, 6 and 7) to two cylinders 7 and 8 (borne by an instrument for measuring thicknesses, which will be referred to farther on) and which can be moved by traversing the length of their axes 11 and 12. The space apart of the faces opposite 5 and 6 is firstly determined by bringing these faces into contact with a calibrated thickness prismatic gauge 10 (Fig. 4). The measuring instrument is calibrated by this operation. Let 13 then be the threading (a screw, for example) whose mean diameter $d$ is desired to be ascertained. Let $p$ be the pitch of the threading $h$ the theoretical height of the threads and $a$ the angle of the apex. The feelers 1 and 2 are selected according to the values of $p$ and $a$: the angle at the apex of the truncations of the members 1 and 2 must be equal to $a$ whereas the mean diameter of 3 and the mean distance apart of the surfaces 4 are determined in relation to $p$ so that there is contact throughout the length of the truncated surfaces and the slide of the thread, this contact taking place on either side of the vertical line $b$ of the mean diameter and according to the generatrix of the surfaces 3 and 4. In these conditions, when the feelers are placed with regard to the threading in the position of Fig. 5, to ascertain $d$ it is only necessary to read the distance between the surfaces 5 and 6 opposite, and to add to this one head the sum of the heights of the truncated surfaces 3 and 4, preferably equal to $$\frac{h}{10}$$

The measurement effected in these conditions is extremely rapid. Moreover, it is very simple and of very great accuracy. As a matter of fact, the nonperpendicularity of the axis of the threading to the axes 11 and 12, involves only a slight error in reading, owing to the reduced range of the surfaces 3 and 4. This same particularity enables very accurate measurements to be made, even with threadings in which the ends of the threads have been distorted by an electrolytical deposit 15 (Fig. 10). Contact with the sides of the thread takes place at the points that are the least distorted, the introduction of the thread into the female part remaining possible in spite of the presence of the deposit 15, owing to the distance between the opposite surfaces 4.

Moreover, all things being equal, the accuracy of the measurement depends upon the precision which enables the measuring appliance to arrive at the thicknesses borne by the feelers.

To secure great precision, a workshop comparator (Fig. 8) of the usual type is used, where 21 and 22 represent the two contacts, terminated by sleeves in which the coaxial rods 23 and 24 can slide, terminated by the contact-pieces 25 and 26. At 17 the drawing shows the drum of the micrometric screw and at 18 the fluted knob, enabling the rod 23 to be moved longitudinally. According to the invention, the male and female feelers carried by the cylinders 7 and 8 are secured to the contact-pieces 25 and 26 by means of the sleeves 27 and 28 and the locking screws 31 and 32. Preferably the sleeves such as 27 are provided inside with two longitudinal bearings 33, arranged symmetrically relatively to the screw 31. The centering and securing of the feelers are thus achieved in very good conditions. For measuring, the threading is held by the bracket 35 raised to the required height by the screw 36. The precision reached in these conditions is about one micron.

The feelers according to the invention can also be adapted to a micrometer, as shown in Figs. 11 to 15. In the form of embodiment described, the cylinder 7 supporting the male feeler 1 can be locked in any position inside the sleeve 41 of the stirrup 43, by means of the screw 45. The cylinder 8, on its side, can receive a traversing movement along its axis, by means of the micrometric screw 46 which is secured to the knob 47 of the graduated drum 48. Furthermore, it is advantageously arranged that the female feeler 2 is self-orienting. To this end, the cylinder 8 can revolve freely in a hollow cylinder 49 seated in the sleeve 51 which extends the stirrup 43, fastened by a threaded ring 52. The retention of the cylinder 8 in the sleeve 49 is moreover ensured by a spring 53 which presses on a sleeve 54 terminated by a collar 55 and fixed in a movable manner by means of a tenon assembly 56 in the cylinder 49 which is provided with seatings for this purpose. Thus, by simply rotating collar 55, sleeve 54 can be disengaged from cylinder 49, which then enables the cylinder 8 to be withdrawn and replaced by an identical cylinder carrying a different female feeler. The micrometric assembly can thus be easily withdrawn by unscrewing the ring 52.

For measuring, the threading which rests on the bracket 61, is conveyed between feelers 1 and 2, the feeler 2 automatically assuming the required position for following the slope of the threads. This appliance easily permits a precision exceeding 0.01 mm. to be attained.

For speedier measurements, the invention also provides for the adaptation of the male and female feelers aforementioned, to the legs 71 and 72 of a sliding calliper-gauge 73. In this case, the contours adopted for the truncated surfaces are those of Fig. 1, these surfaces being borne (Fig. 16) by sleeves 75 and 76 secured in a removable manner to the legs 71 and 72. According to one feature of the invention, these sleeves are fitted with a certain amount of play with regard to said legs. In these conditions, the relative orientation of the truncated surfaces is ensured by bringing the legs 71, 72 together, so that the surfaces come into contact with each other, then their locking is effected by means of the screws 77, 78, 79 and 80. The contacts with the sides of the threads being reduced to a minimum, the errors due to the slope of the helix are made negligible in most cases, and the error can thus be less than 0.05 mm. Moreover, the measurement is particularly simple and speedy.

Naturally, if it is desired to measure internal bores, it is only necessary to adapt the ends of the legs 71 and 72 to receive feelers to measure internal threads.

Thus, by using ordinary workshop appliances, the invention enables measurement of great precision to be obtained, and this in a particularly speedy manner, thanks to the interchangeability of the feelers and the absence of computations.

Moreover, the set of feelers required for measuring all the threadings is particularly reduced, since these feelers are conditioned by two parameters only, instead of the usual three. This means a great saving.

It is evident that the invention is not restricted to the forms of embodiment described, and that all kinds of detail variants could be applied to it without going outside the scope of the present invention. More particularly, if it is desired to measure curvilineal sided threadings (spherical threads, for example) it is obvious that the truncated surfaces would be adapted for that purpose, their generatrices then having a curvilineal section.

I claim:

1. A device for measuring the mean diameter of screw threads comprising an apparatus for measuring thicknesses provided with two arms which are disposed opposite to each other, an axially displaceable feeler carried by each of said arms, means for securing the feelers on the arms, one of the feelers being of the male type and adapted to contact with the flanks of two adjacent threads, the other feeler being of the female type and adapted to contact the two flanks of one thread, said feelers having a common plane of symmetry and being provided with truncated thread engaging surfaces of the same inclination as the flanks of the threads, the height of said truncated surfaces being less than two tenths of the height of the threads and the contact between the flanks of the threads and the said truncated surfaces extending partly on one side and partly on the other side of the mean diameter of the thread, each of said feelers comprising in addition a reference plane surface perpendicular to the axis of displacement of the feeler.

2. A device for measuring the mean diameter of external screw threads comprising an apparatus for measuring thicknesses provided with two arms which are disposed opposite to each other, an axially displaceable feeler carried by each of said arms, means for securing the feelers on the arms, one of the feelers being of the male type and adapted to contact with the flanks of two adjacent threads, the other feeler being of the female type and adapted to contact the two flanks of one thread, said feelers having a common plane of symmetry and being provided with a pair of converging plane thread-engaging surfaces, the dimension of said thread-engaging surfaces in a direction radially of the thread to be measured being less than two tenths of the height of the threads and the contact between the flanks of the threads and the said truncated surfaces extending partly on one side and partly on the other side of the mean diameter of the thread, each of said feelers comprising in addition a reference plane surface perpendicular to the axis of displacement of the feeler.

3. A device for measuring the mean diameter of external screw threads comprising an apparatus for measuring thicknesses provided with two arms which are disposed opposite to each other, an axially displaceable feeler carried by each of said arms, means for securing the feelers on the arms, one of the feelers being of the male type and adapted to contact with the flanks of two adjacent threads, the other feeler being of the female type and adapted to contact the two flanks of one thread, said feelers having a common plane of symmetry and being provided with conical truncated thread-engaging surfaces of the same inclination as the flanks of the threads, and having axes parallel to said plane of symmetry, the height of said truncated surfaces being less than two tenths of the height of the threads and the contact between the flanks of the threads and the said truncated surfaces extending partly on one side and partly on the other side of the mean diameter of the thread, each of said feelers comprising in addition a reference plane surface perpendicular to the axis of displacement of the feeler.

4. A device for measuring the mean diameter of external screw threads comprising an apparatus for measuring thicknesses provided with two arms which are disposed opposite to each other, an axially displaceable feeler carried by each of said arms, means for securing the feelers on the arms, one of the feelers being of the male type and adapted to contact with the flanks of two adjacent threads, the other feeler being of the female type and adapted to contact the two flanks of one thread, said feelers having a common plane of symmetry, the male feeler having a thread-engaging surface in the form of a truncated cone, the axis of which lies in said plane of symmetry, the female feeler having plane thread engaging surfaces, the thread-engaging surfaces of both feelers having the same inclination as the flanks of the thread to be measured and the height of said thread engaging surfaces being less than two tenths of the height of the threads and the contact beween the flanks of the threads and the said thread-engaging surfaces extending partly on one side and partly on the other side of the mean diameter of the thread, each of said feelers comprising in addition a reference plane surface perpendicular to the axis of displacement of the feeler.

5. A device for measuring the diameter of threads comprising a slide caliper having a fixed arm and an arm slidable relatively to the fixed arm, a prismatic sleeve mounted on each arm, means for detachably securing the sleeve on each arm, a thread feeler carried by each sleeve, one of the feelers being of the male type and adapted to contact with the flanks of two adjacent threads, the other feeler being of the female type and adapted to contact the two flanks of one thread, said feelers having a common plane of symmetry and being provided with a pair of converging plane thread-engaging surfaces, the dimension of said thread-engaging surfaces in a direction radially of the thread to be measured being less than two tenths of the height of the threads and the contact between the flanks of the threads and the said thread-engaging surfaces extending partly on one side and partly on the other side of the mean diameter of the thread, each of said feelers comprising in addition a reference plane surface perpendicular to the axis of displacement of the feeler.

6. A device for measuring the diameter of threads comprising a slide caliper having a fixed arm and an arm slidable relatively to the fixed arm, each of said arms having a convex surface, a prismatic sleeve loosely mounted on each arm with play, each sleeve having a threaded opening therein, a screw in each threaded opening for engaging the convex surface of the arm to secure the sleeve to the arm, a thread feeler carried by each sleeve, one of the feelers being of the male type and adapted to contact with the flanks of two adjacent threads, the other feeler being of the female type and adapted to contact the two flanks of one thread, said feelers having a common plane of symmetry and being provided with truncated thread-engaging surfaces of the same inclination as the flanks of the threads, the height of said truncated surfaces being less than two tenths of the height of the threads and the contact between the flanks of the threads and the said truncated surfaces extending partly on one side and partly on the other side of the mean diameter of the thread, each of said feelers comprising in addition a reference plane surface perpendicular to the axis of displacement of the feeler.

References Cited in the file of this patent

UNITED STATES PATENTS

| | | |
|---|---|---|
| 641,173 | Wells | Jan. 9, 1900 |
| 1,291,211 | Slocomb | Jan. 14, 1919 |
| 1,392,313 | Fallow | Oct. 4, 1921 |
| 1,547,514 | Mueller | July 28, 1925 |
| 1,797,121 | Bohn | Mar. 17, 1931 |
| 1,797,122 | Bohn | Mar. 17, 1931 |
| 1,921,899 | Webbeking | Aug. 8, 1933 |
| 2,212,884 | Polasik | Aug. 27, 1940 |
| 2,410,571 | Easton et al. | Nov. 5, 1946 |
| 2,432,160 | Johnson | Dec. 9, 1947 |
| 2,529,931 | Gallup | Nov. 14, 1950 |
| 2,624,121 | Knobel | Jan. 6, 1953 |
| 2,699,610 | Brandt | Jan. 18, 1955 |

FOREIGN PATENTS

| | | |
|---|---|---|
| 321,225 | Germany | May 20, 1920 |